United States Patent [19]

Dudkiewicz

[11] Patent Number: 5,515,168
[45] Date of Patent: May 7, 1996

[54] IDENTIFICATION AND CLASSIFICATION DEVICE AND PROCESS PRACTICED WITH SAID DEVICE

[75] Inventor: Gilbert Dudkiewicz, Ruelishein, France

[73] Assignee: Telmat Informatique, E.U.R.L., Soultz, France

[21] Appl. No.: 160,974

[22] Filed: Dec. 3, 1993

[51] Int. Cl.⁶ .......................... G01B 11/02; G01B 11/24
[52] U.S. Cl. .......................... 356/376; 364/560
[58] Field of Search .................. 356/375, 376; 364/470, 560; 382/8, 2; 33/15; 348/135, 136, 142

[56] References Cited

U.S. PATENT DOCUMENTS

| | | | |
|---|---|---|---|
| 4,885,844 | 12/1989 | Chun | 33/15 |
| 4,975,969 | 12/1990 | Tal | 382/2 |
| 5,163,006 | 11/1992 | Deziel | 364/470 |

FOREIGN PATENT DOCUMENTS

| | | |
|---|---|---|
| 61-44306 | 3/1986 | Japan . |
| 2159943 | 12/1985 | United Kingdom . |
| 2243987 | 11/1991 | United Kingdom . |

OTHER PUBLICATIONS

Baylou et al., "Analyse Automatique du Profil du Visage, Recherche du Meilleur Classifieur a Fin d'Identification", *Artificielle*, Sep., 1981, pp. 371–382.

*Primary Examiner*—F. L. Evans
*Attorney, Agent, or Firm*—Young & Thompson

[57] ABSTRACT

A device for the identification and classification of subjects having variable non-standardized shapes, has a device (1) for taking views, a module (2) for the acquisition and processing of the views and for the extraction of at least one given characteristic dimensional parameter, and a module (3) for identification and classification of the studied subjects from the extracted characteristic parameters.

17 Claims, 2 Drawing Sheets

5,515,168

IDENTIFICATION AND CLASSIFICATION DEVICE AND PROCESS PRACTICED WITH SAID DEVICE

BACKGROUND OF THE INVENTION

1. Field of the Invention

The present invention relates to the field of recognition of spatial or planar shapes, and has for its object a device for the identification and classification of subjects having non-standardized variable shapes, as well as a process practiced with said device.

2. Description of the Related Art

At present, shape recognition systems can in general automatically recognize geometric shapes or even an assembly of geometric shapes. Nevertheless, none of the existing systems permits, in the case of subjects having any shape whatsoever, rarely identically reproduced, effecting in a satisfactory manner a rapid and automatic identification and classification of said subjects based on their external shape.

Moreover, there exist various devices which can generate three-dimensional representations of subjects to be studied, based on taking account of a large number of data, effected in a three-dimensional manner, these data having all to be stored for ultimate reproduction of said representations.

Thus, these devices must have a memory of very large size as well as processing units having high computing power. The result is high cost of material and of operation such that they are an obstacle to profitable industrial use of said devices.

However, it is interesting, particularly in the field of clothing, to be able to produce a rapid classification of a large number of subjects, having non-standardized variable shapes, in a limited number of classes defined for example by means of preliminarily established statistical data, said classification becoming refined in the course of its repetitive use.

Moreover, it is also advantageous to be able to produce virtual images in three dimensions of the subjects to be studied, and particularly to be clothed, while using only a limited memory and processing only a limited number of data.

SUMMARY OF THE INVENTION

To this end, the invention has for its object a device for the identification and classification of subjects having non-standardized variable shapes, and particularly human subjects, characterized in that it is automatic and in that it is principally constituted, on the one hand, by a device for taking pictures, on the other hand, by a module for the acquisition and processing of the view or views and the extraction of at least one given characteristic dimensional parameter and, finally, by a module for the identification and classification of the subjects studied, by means of a characteristic extracted parameter or parameters.

BRIEF DESCRIPTION OF THE DRAWINGS

The invention will be better understood from the following description, which relates to a preferred embodiment, given by way of non-limiting example, and explained with reference to the accompanying schematic drawings, in which.

DESCRIPTION OF THE PREFERRED EMBODIMENTS

Figure 1:
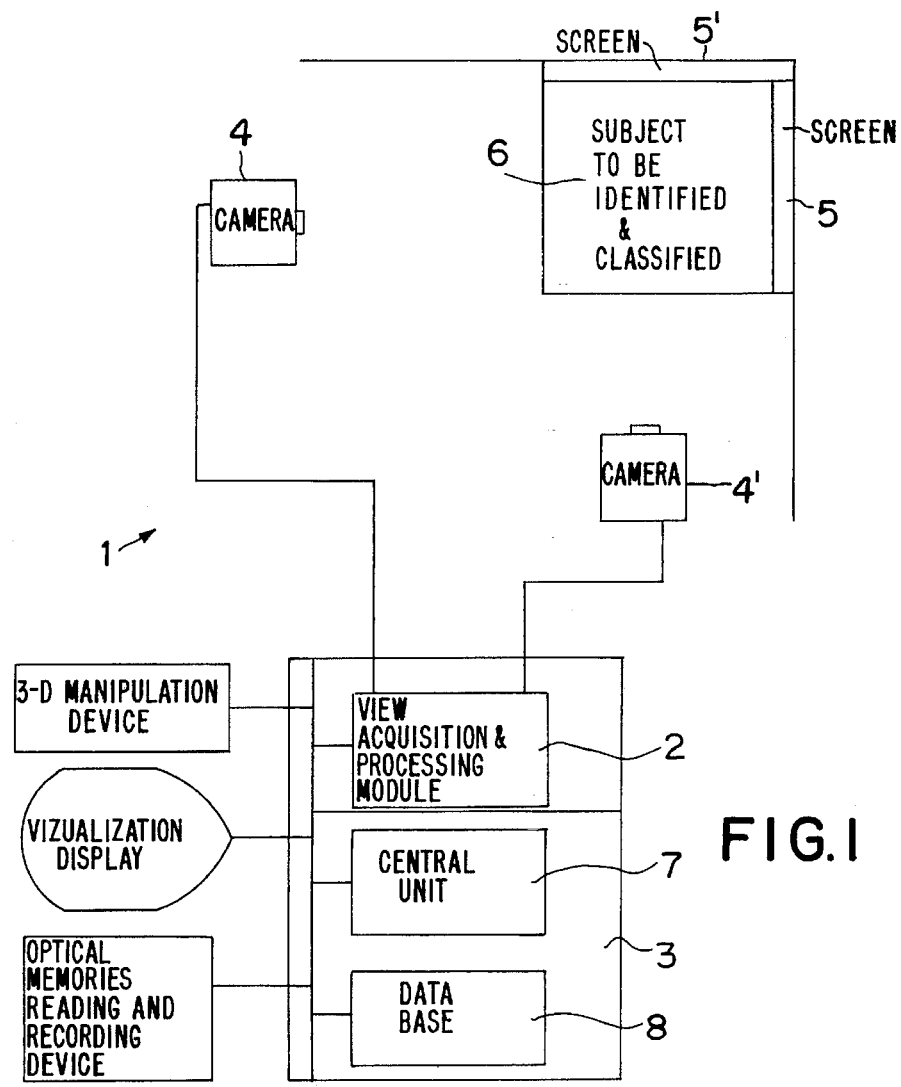
FIG. 1 is a schematic representation of an embodiment of the device according to the invention.

According to the invention, and as shown in FIG. 1 of the accompanying drawings, the device for the identification and classification device is principally constituted, on the one hand, by a device 1 for taking views or pictures, on the other hand, by a module 2 for the acquisition and processing of the view or views and for the extraction of at least one given characteristic dimensional parameter and, finally, by a module 3 for the identification and classification of the subjects studied, by means of the extracted characteristic parameter or parameters.

According to a first characteristic of the invention, the device 1 for taking views is comprised by at least one camera 4, 4' coacting with a background screen 5, 5' which strongly contrasts with the subject 6 to be identified and classified. The background screen or screens 5, 5' can preferably be present in the form of fluorescent scales in front of which are disposed diffusing walls.

According to a preferred embodiment of the invention, shown in FIG. 1 of the accompanying drawings, the device 1 for taking views comprises preferably two cameras 4 and 4', whose taking axes form a right angle with each other, each coacting with a corresponding background screen 5 and 5'.

Thus, in the case of human subjects 6, it is possible to effect simultaneously a front view and a profile view, the two views being adapted to be taken at different distances and in different planes, as a function of the dimensional parameters to be extracted (FIGS. 2, 3A, 3B, 4A and 4B).

According to another embodiment, not shown in the accompanying drawings, the device 1 for taking views is constituted by a camera 4, 4' movable about the subject 6 to be identified and classified, the background screen 5, 5' being adapted to be displaced in accordance with said camera 4, 4'.

The subject 6 could thus be the object of several consecutive picture takings at different angles and according to different planes, permitting having as many view planes as is necessary to be able to determine the characteristic parameters sufficient for the identification and classification of the subject 6. Of course, the movable camera 4, 4' could also be replaced by n fixed cameras disposed at appropriate positions.

The at least one camera 4, 4' could also be fixed, the front and profile views of the subject to be studied being effected consecutively, after a suitable rotation of said subject. The module 2 for acquisition and processing of the view or views and for extraction is present preferably in the form of a video interface circuit, and an image processing unit, of the digital type, known to those skilled in the art.

As shown also in FIG. 1 of the accompanying drawings, the module 3 for identification and classification is constituted by a central unit 7 connected to a data base 8, said module 3 integrating also a program of simulation of an auto-organizing neural network, as well as a program for the generation of three-dimensional representations and a program permitting effecting measurement of the subject, based on the acquired views.

The mentioned neural network simulator permits, by means of trial procedures, to refine the classification and to increase the efficacy of the module 3 by substantially reducing the working time of the central unit 7.

The construction and mode of operation of such a neural network simulator are particularly described in U.S. Pat. No. 4,326,259, issued Apr. 20, 1982, in the name of Nestor Associates and the program for the generation of three-dimensional representations can be of the type known to those in the art under the term "designer" or also "facet generator".

The module 3 could also comprise a device for visualization of the three-dimensional representation, a device for manipulation of this latter and a device for reading and recording optical memories in the form of small individual cards (not shown).

It is thus possible to store all the dimensional characteristics of the subject and its three-dimensional representation, on a support of the "identification" type, which can be directly used by a business person, for example, who has a suitable reading and visualization apparatus. This latter could then effect tests of virtual fitting, under the control of the subject to be fitted and without taking real measurements. The reading and inscribing of the optical supports can be preferably effected by means of a laser technique.

The invention also has for its object an automatic process for the identification, classification and representation of subjects having non-standardized variable shapes, consisting essentially in taking at least one planar view, preferably contrasted, of the subject to be studied, taking account of and processing the view or views thus taken, then extracting from it one or several given characteristic dimensional parameters, then beginning a process for identification and classification of the subject to be studied, based on extracted characteristic parameters, then, as a function of the result of said procedure, either indicating the coordinates of the class to which the subject belongs, or generating a new class defined by the parameters of said subject or integrating said subject into an existing class while memorizing its characteristic parameters and reorganizing the classification structure as a result, and, finally, as the case may be, effecting an approximate three-dimensional representation, in the form of an envelope, of the subject to be studied based on, on the one hand, extracted dimensional parameters of the mentioned view or views, and, on the other hand, of corresponding dimensional parameters and of a three-dimensional representation of a reference design representative of the class to which the subject to be studied belongs.

The initial classes, characterized by particular values and their input parameters, particularly the dimensional parameters characteristic of their reference designs, could, for example, be established as a function of statistical data resulting from a preliminary study of a given population of subjects 6 or else by memorizing the values of the parameters of a given number of designs of types of subjects 6.

Of course, the determination of the characteristic parameters will, during the phase of initialization and during the practice of the procedure, be necessarily effected under identical conditions.

According to a characteristic of the invention, the taking account of and processing of the view or views which have been taken consists in regrouping the different desired views and defining on each view the contour of the subject to be studied.

Figure 2:
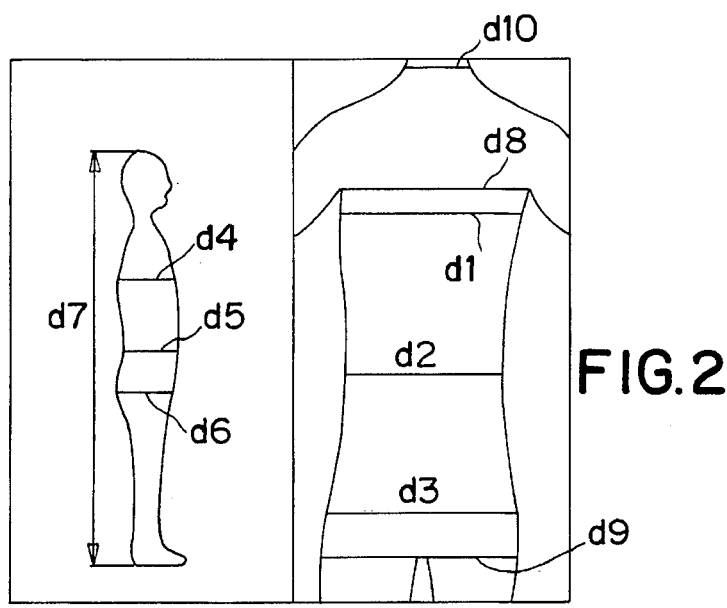
FIG. 2 shows, by front and profile views, a contour of a human subject as well as the measurements of which account is taken for the identification and classification of said subject.

The extraction of the characteristic parameters then consists in effecting a computed series of measurements of distances d1, d2, d3, d4, d5, d6, d7, d8, d9, d10 between the predetermined points of the contour or contours that are obtained (FIG. 2).

According to a supplemental characteristic of the invention, the extracted parameters are divided in at least two groups, each group of parameters being subjected to a distinct procedure for identification and classification, permitting obtaining several partial classifications corresponding to the different constituent portions of the subject to be studied.

In the case of human subjects and particularly in the framework of the use of the invention in the field of industry and commerce for tailoring, the distance measurements taken into account for the classification are preferably effected at the chest d1, d4, at the waist d2, d5 and at the hips d3, d6, the size or height d7 of the subject being also taken into account.

Moreover, it is also possible to have two partial classifications of the subject, namely, a first classification for the upper part of the subject, above the waist for example, and a second partial classification for the lower part, below the waist, permitting defining a size of jacket and a size of trousers, which may be different for the same subject.

In the case in which a virtual three-dimensional representation of the subject to be studied is envisaged, the preliminary phase also consists in acquiring and memorizing, at the outset, on the one hand, the three-dimensional representations of a plurality of reference designs for a given population of subjects and, on the other hand, the measurement values of the distances m1, m2 effected on said reference designs, thanks to the planar views taken, at predetermined transverse cross sections S, as well as the heights or sizes d7 of said reference designs.

During creation of a new class, the three-dimensional representation and the different dimensional parameters of the subject, constituting the reference design of this new class, must also be memorized.

Figures 3A, 3B, 4A, 4B:
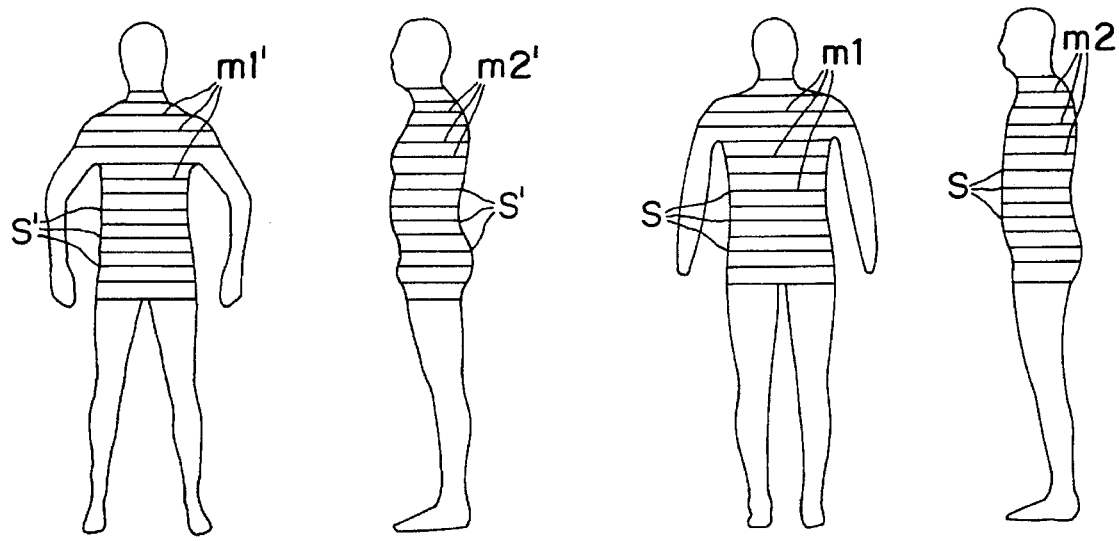
FIGS. 3A and 3B show the different measurements taken from a reference design, shown by its contour in a front view and a profile view.
FIGS. 4A and 4B are views similar to FIGS. 3A and 3B showing the different measurements taken on a subject to be studied corresponding to the measurements taken from the reference design, and, FIG. 5 is a schematic view showing the contours of a single cross section of a reference design and of a subject to be studied.

As shown in FIGS. 3A and 3B of the accompanying drawings, the distance measurements m1', m2' are effected, in the planar pictures taken, at the transverse cross sections S' of the subject to be studied, distributed over all the height of said subject or within a zone of this latter serving for its classification, the division of the cross sections S' being similar to that of the cross sections S defined on the reference design corresponding to said subject, but nevertheless a function of the ratio of the heights or sizes d7 between said subject and said reference design.

Thus, the cross sections S, S' can, for example, be uniformly grouped at a predetermined region of the reference design and of the subject to be studied, the distance between two given successive given cross sections S', defined on the planar views of said subject, being determined by the distance separating the two corresponding cross sections S defined on the planar views of the reference design and by the ratio between the sizes d7 of the subject and of the design.

Moreover, said cross sections S, S' could be effected either in horizontal planes, or in planes inclined relative to the horizontal.

Figure 5:
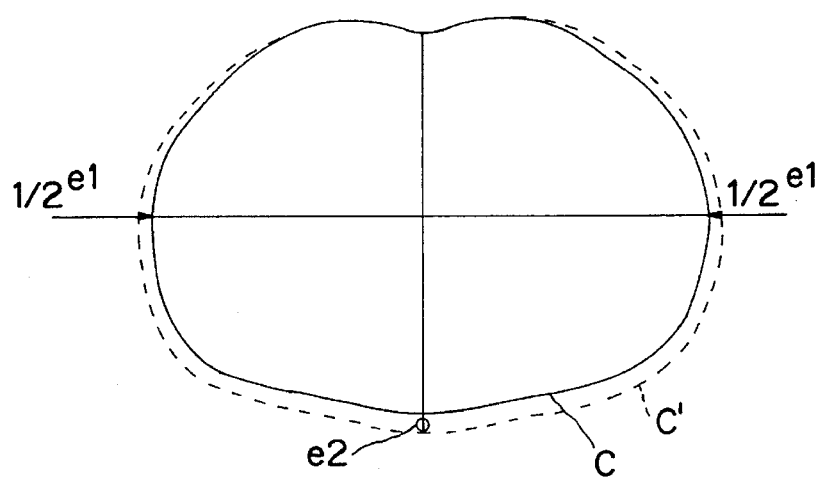

According to a supplemental characteristic of the invention, represented in part in FIG. 5 of the accompanying drawings, the approximate three-dimensional embodiment of the subject to be studied consists in calculating, for each pair of corresponding cross sections S and S', the differences e1, e2 between the values of the distance measurements m1, m2 and m1', m2', effected on the different planar views, respectively of the reference design in question and of the subject to be studied, then in constructing by interpolation from the contours C of the memorized cross sections S of the reference design and from the differences e1, e2 previously calculated, contours C' of the cross sections S' of the representation approximating the subject to be studied, and, finally, assembling, by superposing them in a predetermined manner and taking account of the ratio of the sizes d7 between the reference design and the subject to be studied, the different contours C' previously obtained so as to constitute, after application of a second processing by interpolation, a three-dimensional network envelope representing the subject to be studied.

The contours C, corresponding to the external contours of the transverse cross sections through the mannequins or reference designs, are stored in the memory of the device according to the invention, and their shapes, their lengths (circumferences) and their dimensions m1, m2 in the orthogonal view planes of front and profile are also stored in said memory.

The differences e1, e2, of the algebraic type, are defined in the framework of the described example, in the following manner: e1=m1'−m1 and e2=m2'−m2.

As a result, the only data to be stored for a subject under consideration are constituted by the size d7, the identity of the class to which the subject belongs or the reference design mostly closely approaching this latter, and finally, the various differences e1, e2 defined above, the three-dimensional representation of the subject to be studied being generated as a function of what is needed.

The process according to the invention can also consist, in the case of a human subject, in generating, from clothing patterns adapted to its three-dimensional representation, which can be stored in an optical memory containing the assembly of the dimensional characteristics of the subject and of said three-dimensional representation, the virtual operations of trying on clothing of this latter on a visualization screen, after reading, as the case may be, said optical memory.

Moreover, so as to determine the measurements of the subjects, the process could also consist in effecting, by means of taking a front view and a profile view, to scale, of the subject in a predefined position, automatic measurements of length and/or of circumference characteristic of the measurements of the subject, from dimensional data and/or the envelope relative to a design or to a reference mannequin representing the class or group to which belongs the subject and recorded according to planar and/or three-dimensional views previously established under identical conditions.

Thanks to this arrangement, it is possible to effect automatically a plurality of virtual measurements, without physical contact with the subject, the mannequin or the design, whose exact dimensions are known, serving as a standard of measurement from which the actual measurements of the subject to be studied can be extrapolated.

To do this, the mannequin or design and the subject to be studied must have positionings and poses which are identical during the taking of the view (preferably the arms and legs slightly spread).

The positions of taking the measurements on the subject to be studied could correspond to those currently used in the field of manufacture of clothing (neck measurement, chest measurement, waist measurement, arm length, shoulder size, inseam, . . . ). However, specific unconventional locations could also be selected by means of communication modules interacting between the device and the user.

According to a first modification of the invention, the determination of the measurements can consist first in obtaining the three-dimensional grid work envelope representing the subject to be studied, arranging markers on the three-dimensional envelope of the design or of the mannequin, these markers corresponding to circumferences or delimiting portions whose dimensions, particularly length, are to be determined for a given subject, these markers being located at the same places on the three-dimensional envelope representing said subject, which envelope is calculated from the envelope of the mannequin or of the design representing the class of said subject.

According to a second modification, the determination of the measurements consists in effecting characteristic length measurements along the contours extracted or determined in the stored view planes of the subject and the characteristic measurements of circumference about the contours C' of the corresponding cross sections S', obtained by interpolation from the contours C of the memorized cross sections S of the design or reference mannequin corresponding to said subject and the differences e1, e2 (FIG. 5).

So as to permit taking particular shapes of the subject body, the process can moreover consist in using the graphical technique known under the term "interference technique", at least as to the portion of the body of the subject having a convex or concave shape, or pronounced curvature, such as for example the shoulders or the bust of a woman. The above technique consists in projecting on the shape to be taken up a grid and observing the projected grid through another grid. The obtained image contains families of curves which are alternately light and dark called interference fringes. Each of these fringes shows, under certain conditions, a contour line of the shape under consideration.

Thanks to the invention, it is therefore possible to effect an automatic and rapid identification and classification of subjects having various non-standardized shapes, said classification being refined and improved in efficiency in the course of repeated use. Moreover, a reconstruction in three-dimensions of the studied subject by means of the stored data could ultimately be effected, thereby permitting providing a three-dimensional clothing simulation of said subject. Moreover, it is also possible, thanks to the device and to the above process, to effect an approximate automatic determination of the measurements of the subject to be studied, without physical contact with said subject.

The present invention, although described essentially in the framework of the recognition of human shapes, could be applied in quite different fields such as, for example, microbiology, for the recognition of bacteria, the taking of views being then effected by means of a camera mounted on a microscope.

Of course the invention is not limited to the embodiment described and shown in the accompanying drawings. Modifications remain possible, particularly as to the construction of various elements or by substitution of technical equivalents, without thereby departing from the scope of protection of the invention.

What is claimed is:

1. A device for the identification and classification of subjects having variable non-standardized shapes, comprising a device (1) for taking views, a module (2) for the acquisition and processing of the views and for the extraction of at least one given characteristic dimensional parameter, and a module (3) for identification and classification of the studied subjects from said extracted characteristic parameters, the module (3) for identification and classification comprising a central unit (7) connected to a database (8), said module (3) for identification and classification further comprising means for running an auto-organizing neural network simulation program, as well as means for running a program for generation of three-dimensional representations and means for running a program permitting performing measurement on the subject, based on the taken views.

2. Device according to claim 1, wherein the view-taking device (1) is comprised by at least one camera (4, 4') coacting with at least one background screen (5, 5') strongly contrasting with the subject (6) to be identified and classified.

3. Device according to claim 2, wherein the view-taking device (1) comprises two cameras (4 and 4'), whose taking axes form a right angle with each other, each said camera coacting with a respective one of said at least one background screen (5 and 5').

4. Device according to claim 1, wherein the module (3) for identifications and classification comprises moreover a device for visualization of the three-dimensional representation, a device for manipulation of this latter, and a device for reading and storing of optical memories.

5. Automatic process for the identification and classification and representation of subjects having non-standardized variable shapes, comprising taking at least one planar view of a subject to be studied, processing the taken view, extracting at least one given characteristic dimensional parameter from said taken planar view, then effecting a procedure of identification and classification of the subject to be studied based on said at least one extracted characteristic dimensional parameter, then as a function of the result of this procedure either indicating coordinates of a class to which the subject belongs, or generating a new class defined by the at least one extracted dimensional parameter of the subject or integrating said subject into an existing class by memorizing the at least one extracted dimensional characteristic parameter and reorganizing a structure of the classification accordingly, and finally effecting an approximate three-dimensional representation, in a form of an envelope, of the subject to be studied from said at least one extracted dimensional parameter of the taken view, and from measured dimensional parameters and from a three-dimensional representation of a reference design representative of the class to which the subject to be studied belongs.

6. Process according to claim 5, wherein the processing of the taken views consists in assembling the different views and defining, on each view, the contour of the subject.

7. Process according to claim 6, further comprising the step of extracting at least one dimensional characteristic parameter from the defined contours by effecting an ordered series of measurements of distances (d1, d2, d3, d4, d5, d6, d7, d8, d9, d10) between predetermined points of the defined contours.

8. Process according to claim 5, wherein the extracted at least one dimensional parameter is divided into at least two groups, each group being subjected to a separate process of identification and classification, to obtain several partial classifications corresponding to the different constituent portions of the subject to be studied.

9. Process according to claim 7, wherein the subjects are human, the measurements of distances considered for the classification being those effected at the chest (d1, d4), the waist (d2, d5) and the hips (d3, d6), the height (d7) of the subject also being measured.

10. Process according to claim 5, further comprising the steps of memorizing the three-dimensional representations of a plurality of reference designs for a given population of subjects, and memorizing the values of the measurements of distance (m1, m2) effected on said reference designs by the planar views taken, at predetermined transverse cross sections (S), as well as the sizes (d7) of said reference designs.

11. Process according to claim 10, wherein the measurements of distance (m1', m2') are effected on the planar views taken, at the transverse cross sections (S') of the subject to be studied, distributed over all the height of said subject or within a region of the subject serving for its classification, the distribution of the cross sections (S') being similar to the distribution of the cross sections (S) defined on the reference design corresponding to said subject, but nevertheless a function of the ratio of the sizes (d7) between said subject and said reference design.

12. Process according to claim 10, wherein the production of the three-dimensional representation approximating the subject to be studied consists in calculating, for each corresponding pair of cross sections (S and S') the differences (e1, e2) between the values of the distance measurements (m1, m2 and m1', m2') effected in the different view planes, respectively of the reference design in question and of the subject to be studied, then in constructing, by interpolation from contours (C) of the memorized cross sections (S) of the reference design and the differences (e1, e2) previously calculated, the contours (C') of the cross sections (S') of the approximate representation of the subject to be studied and, finally, gathering, by superposing them in an ordered manner and calculating the ratio of the sizes (d7) between the reference design and the subject to be studied, the various contours (C') previously obtained so as to constitute, after the application of processing by interpolation, a three-dimensional grid work envelope representing the subject to be studied.

13. Process according to claim 5, wherein the subject is human, and wherein said process further comprises the step of generating from clothing patterns adapted to three-dimensional representation, stored in an optical memory containing all of the dimensional characteristics of said subject and of its three-dimensional representation, the virtual operations of trying on clothing of said three-dimensional representation on a visualization screen, after reading said optical memory.

14. Process according to claim 5, further comprising the step of determining the measurements of a subject by effecting, by means of a front view and a profile view to scale, of the subject in a predetermined position, automatic measurements of at least one of length and circumference characteristics of the measurements of the subject, from at least one of dimensional data and the envelope representative of one of a design and a reference mannequin representing the one of class and group to which the subject belongs, and recorded according to one of planar and three-dimensional views previously taken under identical conditions.

15. Process according to claim 14, further comprising the step of, prior to obtaining a three-dimensional grid work envelope representing the subject to be studied, arranging markers about the three-dimensional envelope of the design or of the reference mannequin, the markers corresponding to at least one of circumferences and delimiting portions whose dimensions are to be determined for a given subject, the markers being located at the same positions on the three-dimensional envelope representing said subject, which envelope is calculated from the envelope of the reference mannequin or design representing the class of said subject.

16. Process according to claim 14, further comprising the steps of effecting length measurements on one of said contours of the cross sections (S') of said approximate representation of the subject to be studied and on contours previously determined in the stored planar views of the subject and effecting circumference measurements about the contours (C') of the cross sections (S') of said approximate representation of the subject to be studied, obtained by interpolation from the contours (C) of the memorized cross sections (S) of the design or reference mannequin corresponding to the subject and to the differences (e1, e2).

17. Process according to claim 5, which further comprises the step of applying a graphical technique known as "interference technique", at least to the portions of the body of the subject having one of a concave and convex shape, and a pronounced curvature, comprising the shoulders or the bust of a female.

* * * * *